United States Patent
Li et al.

(10) Patent No.: US 7,323,215 B2
(45) Date of Patent: Jan. 29, 2008

(54) FREE LAYER DESIGN FOR CPP GMR ENHANCEMENT

(75) Inventors: Min Li, Dublin, CA (US); Cheng T. Horng, San Jose, CA (US); Ru-Ying Tong, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 433 days.

(21) Appl. No.: 10/845,888

(22) Filed: May 14, 2004

(65) Prior Publication Data

US 2005/0254181 A1    Nov. 17, 2005

(51) Int. Cl.
*B05D 5/12* (2006.01)
(52) U.S. Cl. ............... 427/127; 427/128; 427/131; 360/342.12
(58) Field of Classification Search ............... 427/127, 427/128, 131; 360/342.12
See application file for complete search history.

(56) References Cited

U.S. PATENT DOCUMENTS

| | | | |
|---|---|---|---|
| 5,627,704 A | 5/1997 | Lederman et al. | 360/113 |
| 5,668,688 A | 9/1997 | Dykes et al. | 360/113 |
| 6,034,847 A * | 3/2000 | Komuro et al. | 360/126 |
| 6,519,124 B1 | 2/2003 | Redon et al. | 360/324.2 |
| 6,525,911 B1 * | 2/2003 | Gill | 360/319 |
| 6,529,353 B2 | 3/2003 | Shimazawa | 360/324.2 |
| 6,680,831 B2 | 1/2004 | Hiramoto et al. | 360/324.11 |
| 6,893,741 B2 * | 5/2005 | Doerner et al. | 428/670 |
| 2002/0048127 A1 | 4/2002 | Fukuzawa et al. | 360/324.1 |

OTHER PUBLICATIONS

Co-pending U.S. Appl. No. 10/886,288, filed Jul. 7, 2004, "Improved Seed/AFM Combination for CPP GMR Device", assigned to the same assignee as present invention.
2002 IEEE Int'l Mag. Conf., Apr. 28-May 2, RAI Congress, Center, Amsterdam, The Netherlands, Digest Intermag 2002, Section GA 02, "The Applicability of CPP-GMR for Over 100 Gbps;".

* cited by examiner

*Primary Examiner*—Alain L. Bashore
(74) *Attorney, Agent, or Firm*—Saile Ackerman LLC; Stephen B. Ackerman

(57) ABSTRACT

By using a composite free layer of Fe25% Co/NiFe, an improved CPP GMR device has been created. The resulting structure yields a higher CPP GMR ratio than prior art devices, while maintaining free layer softness and acceptable magnetostriction. A process for manufacturing the device is also described.

18 Claims, 1 Drawing Sheet

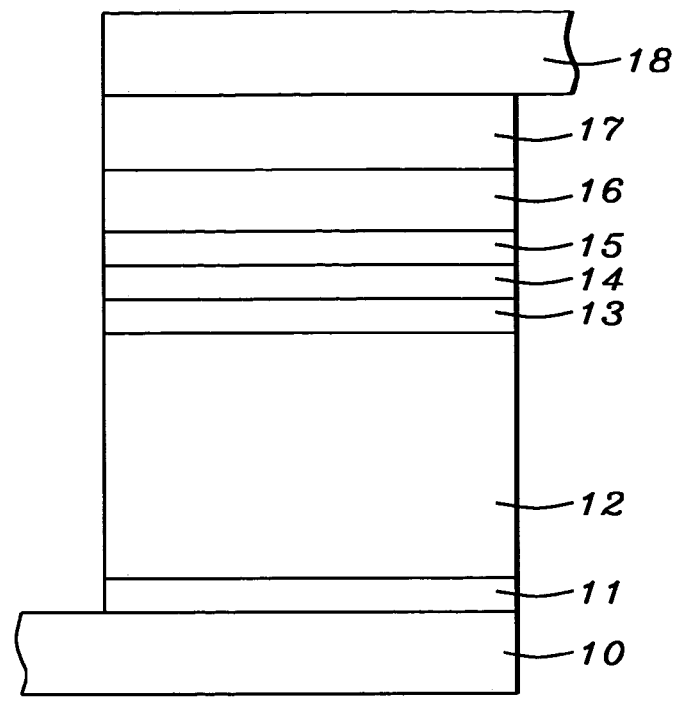
FIG. 1 – Prior Art
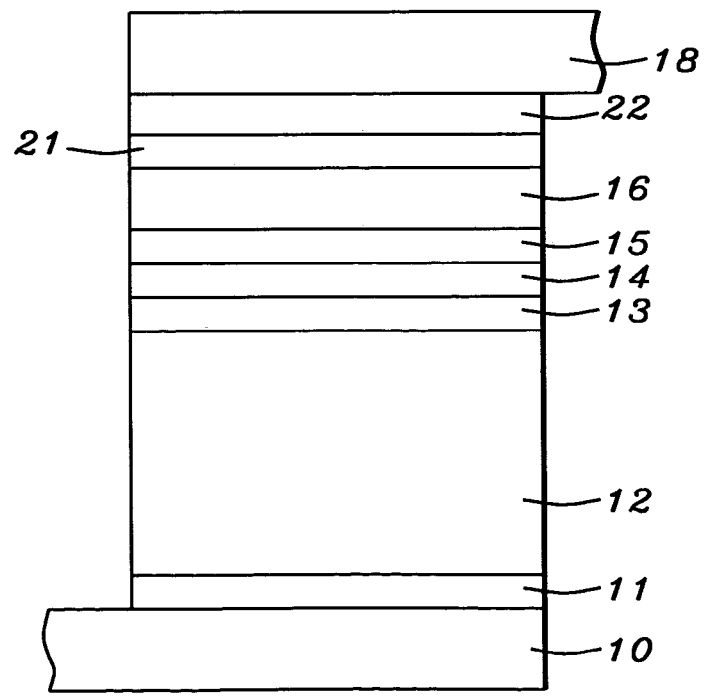
FIG. 2

FREE LAYER DESIGN FOR CPP GMR ENHANCEMENT

FIELD OF THE INVENTION

The invention relates to the general field of CPP GMR read heads with particular reference to the free layer substructure.

BACKGROUND OF THE INVENTION

The principle governing the operation of most magnetic read heads is the change of resistivity of certain materials in the presence of a magnetic field (magneto-resistance or MR). Magneto-resistance can be significantly increased by means of a structure known as a spin valve where the resistance increase (known as Giant Magneto-Resistance or GMR) derives from the fact that electrons in a magnetized solid are subject to significantly less scattering by the lattice when their own magnetization vectors (due to spin) are parallel (as opposed to anti-parallel) to the direction of magnetization of their environment.

The key elements of a spin valve are illustrated in FIG. 1. They are seed layer 11 on which is antiferromagnetic layer 12 whose purpose is to act as a pinning agent for a magnetically pinned layer. The latter is a synthetic antiferromagnet formed by sandwiching antiferromagnetic coupling layer 14 between two antiparallel ferromagnetic layers 13 (AP2) and 15 (AP1).

Next is a copper spacer layer 16 on which is low coercivity (free) ferromagnetic layer 17. A contacting layer such as lead 18 lies atop free layer 17. When free layer 17 is exposed to an external magnetic field, the direction of its magnetization is free to rotate according to the direction of the external field. After the external field is removed, the magnetization of the free layer will stay at a direction, which is dictated by the minimum energy state, determined by the crystalline and shape anisotropy, current field, coupling field and demagnetization field.

If the direction of the pinned field is parallel to the free layer, electrons passing between the free and pinned layers suffer less scattering. Thus, the resistance in this state is lower. If, however, the magnetization of the pinned layer is anti-parallel to that of the free layer, electrons moving from one layer into the other will suffer more scattering so the resistance of the structure will increase. The change in resistance of a spin valve is typically 8-20%.

Earlier GMR devices were designed so as to measure the resistance of the free layer for current flowing parallel to its two surfaces. However, as the quest for ever greater densities has progressed, devices that measure current flowing perpendicular to the plane (CPP) have also emerged. CPP GMR heads are considered to be promising candidates for the over 100 Gb/in$^2$ recording density domain (see references 1-3 below).

A routine search of the prior art was performed with the following references of interest being found:

No references were found that disclosed a specific percentage of Fe in the free layer. In U.S. Pat. No. 6,680,831, Hiramoto et al. disclose a simplified SV structure with only a pinned layer and a free layer separated by an intermediate, non-magnetic, layer. The pinned layer could be FeCo containing at least 50% Fe or Co. In U.S. Pat. No. 6,529,353, Shimazawa et al. and in U.S. Pat. No. 6,519,124, Redon et al. teach that the free layer may be a laminate of FeCo and NiFe. U.S. Patent Application 2002/0048127, Fukuzawa et al. teach a CoFeNi free layer for a higher rate of change in MR than CoFe/NiFe. Both Redon and Shimazawa disclose a laminated CoFe/NiFe free layer. Unless otherwise specified, CoFe usually means Co90Fe10; CoFe/NiFe composited free layers of this type are well known for spin valve applications.

An improved free layer in a CPP spin valve needs to achieve three objectives:
1) higher CPP GMR ratio;
2) low coercivity i.e., good magnetic softness; and
3) low positive magnetostriction.

None of the prior art inventions listed above achieve all three of these, particularly the low positive magnetostriction

REFERENCES

[1] M. Lederman et al U.S. Pat. No. 5,627,704.
[2] J. W. Dykes et al U.S. Pat. No. 5,668,688
[3] Min Li et al patent application Ser. No. 10/886,288 filed Jul. 7, 2004, "Spin valve structure with enhanced CPP GMR, and process for making it"

SUMMARY OF THE INVENTION

It has been an object of at least one embodiment of the present invention to provide a CPP GMR magnetic read head having improved stability and performance.

Another object of at least one embodiment of the present invention has been to provide a process for manufacturing said read head.

Still another object of at least one embodiment of the present invention has been that said process be compatible with existing processes for the manufacture of CPP GMR devices.

These objects have been achieved by replacing the conventional free layer with a Fe25% Co/NiFe composite free layer for CPP GMR enhancement. The resulting CPP spin valve structure yields higher CPP GMR ratios, while maintaining both free layer softness and an acceptable magnetostriction constant. It is important to control the layer thicknesses so the FeCo layer is between about 5 and 15 Angstroms thick and the NiFe layer is between about 15 and 50 Angstroms thick.

BRIEF DESCRIPTION OF THE DRAWINGS

FIG. 1 shows a GMR stack of the prior art in which has a conventional free layer.
FIG. 2 shows a GMR stack according to the teachings of the present invention.

DESCRIPTION OF THE PREFERRED EMBODIMENTS

It is well known that besides the requirement of a reasonable RA (resistance-area product) and higher CPP GMR, the free layer of the CPP GMR structure has to be magnetically soft and its magnetostriction constant needs to be within the desirable range (positive $1-3 \times 10^{-6}$). The present invention describes a new free layer design for a spin valve having enhanced CPP GMR.

While it is known that Fe rich CoFe can be used in CPP GMR spin valve structures for CPP GMR ratio improvement, this is offset by the fact that Fe rich CoFe also has too large an Hc (coercivity) value, as well as undesirable magnetostriction, to be useful as a free layer. To overcome this difficulty we have made use of the fact that the magnetic properties of a composite free layer made of CoFe and NiFe can be adjusted through control of the thickness ratio between the NiFe and the CoFe.

In conventional (standard) CPP spin valve structures, composite free layers made of CoFe(10%) and NiFe(19%) have been used. Single ferromagnetic films made of CoFe (10%) and NiFe(19%) are supposedly non magnetostrictive (i.e. the magnetostriction coefficient is around $10^{-7}$. For CoFe films, magnetostriction increases with higher Fe composition while for NiFe films, negative magnetostriction is obtained at lower Fe concentrations. The present invention takes advantage of these characteristics by laminating Fe(min. 25%)Co with NiFe(17%) to provide a replacement for CoFe(10%)/NiFe thereby improving the CPP GMR while still maintaining free layer softness and acceptable magnetostriction.

The process concludes with the deposition of upper lead layer 18, the completed structure being now ready to serve as a CPP GMR read head having a GMR ratio of at least 5.9%.

Confirmatory Results

To confirm the effectiveness of the invention, the following structures were formed and then evaluated as CPP GMR readers. The number after each named layer is thickness in Angstroms:

A. (prior art) Ta5/NiCr45/IrMn70/Fe(25%)Co36/Ru7.5/[Fe (25%)Co12/Cu3]2/Fe(25%)Co12/Cu2.6/AlCu8.0/Cu2.0/ Co(90%)Fe12/NiFe35/Cu30/Ru200.

B. Ta5/NiCr45/IrMn70/Fe(25%)Co36/Ru7.5/[Fe25Co12/ Cu3]2/Fe(25%)Co12/Cu2.6/AlCu8.0/Cu2.0/Fe(25%) Co10/NiFe35/Cu30/Ru200

The results are summarized in TABLE 1 below:

TABLE I

| | free layer structure | RA (ohm.µm$^2$) | DR/R (%) | Hc (Oe) | Hin (Oe) | Magneto-striction |
|---|---|---|---|---|---|---|
| A | Co(90%)Fe12/NiFe25 | 0.5 | 5.48 | 7.7 | 1.3 | $1.20 \times 10^{-6}$ |
| B | Fe(25%)Co10/NiFe35 | 0.5 | 5.9 | 7.5 | 1.5 | $2.30 \times 10^{-6}$ |

Referring now to FIG. 2, we provide a description of the process of the present invention. In the course of this description, the structure of the present invention will also become apparent.

The process begins with the formation of lower lead 10 onto which is deposited seed layer 11 followed by pinning layer 12. Layer 12 comprises a suitable antiferromagnetic material such as IrMn and it is deposited to a thickness between 45 and 80 Angstroms. Layer 13 (AP2), the first of the two antiparallel layers that will form the synthetic AFM pinned layer, is then deposited onto layer 12. This is followed by layer of AFM coupling material 14 and then AP1 layer is deposited thereon. Next, copper spacer layer 16 is deposited on AP1 layer 15.

Note that although layer 16 is referred to simply as a "copper spacer" layer, in practice it is a multilayer structure that includes Cu/AICU/PIT/IAO/Cu, AICU is a discontinuous layer of alumina having Cu in the holes, PIT is an abbreviation for pre-ion treatment and IAO stands for ion assisted oxidation. For the sake of simplification, we will continue to refer to 'copper spacers' but it should be borne in mind that they are actually the more complicated structures described above.

Now follows a key feature of the invention which is the formation of the free layer as a bilayer of cobalt iron, containing at least 25 atomic percent iron, between about 5 and 15 Angstroms thick, and a layer of nickel iron (containing, typically, between about 15 and 20 atomic % iron), between about 15 and 50 Angstroms thick. These are shown as layers 21 and 22 in FIG. 2. The order in which these two layers that make up the free layer are deposited is a matter of designer's choice but, in practice, for bottom spin valves we prefer to deposit the FeCo first, while for top spin valves we prefer to deposit NiFe first.

The resulting free layer has a magnetostriction constant that is between 1 and $3 \times 10^{-6}$ (positive) and a coercivity between about 5 and 10 Oe. Similar results are obtained with even greater iron concentrations, such as 50 and 75%, in the CoFe layer.

It can be seen that structure B with the Fe 25% Co10/ NiFe35 free layer showed higher CPP GMR ratio than reference structure A. The free layer coercivity (Hc) and interlayer coupling (Hin) are similar between structure A and B and the magnetostriction of structure B is higher than that of reference structure A but is still within the desirable range.

What is claimed is:

1. A method to form free layer in a GMR read head, comprising:

depositing a layer of cobalt iron to a thickness of between about 5 and 15 Angstroms, containing at least 25 atomic percent iron, and then depositing thereon a layer of nickel-iron to a thickness of between about 15 and 50 Angstroms, thereby forming said free layer.

2. The method of claim 1 wherein said layer of cobalt iron is deposited onto a non-magnetic spacer layer.

3. A method to form free layer in a GMR read head, comprising:

depositing a of layer of nickel-iron, to a thickness of between about 15 and 50 Angstroms, and then depositing thereon a layer of cobalt iron, to a thickness of between about 5 and 15 Angstroms, that contains at least 25 atomic percent iron, thereby forming said free layer.

4. The method of claim 3 wherein said layer of nickel iron is deposited onto a non-magnetic seed layer.

5. A process to manufacture a CPP GMR read head, comprising:

depositing, in unbroken succession on a lower lead layer, a seed layer and a pinning layer;

on said pinning layer, depositing an AP2 layer;

depositing a layer of AFM coupling material on said AP2 layer;

depositing an AP1 layer on said layer of AFM coupling material;

depositing a copper spacer layer on said AP1 layer;

depositing a layer of cobalt iron, to a thickness of between about 5 and 15 Angstroms, containing at least 25 atomic percent iron, on said copper spacer layer;

depositing a layer of nickel iron to a thickness of between about 15 and 50 Angstroms, on said layer of cobalt iron, thereby, together with said layer of cobalt iron, forming a free layer having a magnetostriction constant that is between 1 and $3\times10^{-6}$; and on said free layer, depositing an upper lead layer, thereby forming said CPP GMR read head.

6. The process described in claim 5 wherein said pinning layer is IrMn deposited to a thickness between 45 and 80 Angstroms.

7. The process described in claim 5 wherein said CPP GMR read head has a GMR ratio greater than 5.9%.

8. The process described in claim 5 wherein said cobalt iron layer contains between about 20 and 30 atomic percent iron.

9. The process described in claim 5 wherein said cobalt iron layer contains between about 40 and 60 atomic percent iron.

10. The process described in claim 5 wherein said cobalt iron layer contains between about 70 and 80 atomic percent iron.

11. The process described in claim 9 wherein said free layer has a coercivity between about 5 and 10 Oe.

12. A process to manufacture a CPP GMR read head, comprising:

depositing, in unbroken succession on a lower lead layer, a seed layer and a pinning layer;

on said pinning layer, depositing an AP2 layer;

depositing a layer of AFM coupling material on said AP2 layer;

depositing an AP1 layer on said layer of AFM coupling material;

depositing a copper spacer layer on said AP1 layer;

depositing, to a thickness of between about 15 and 50 Angstroms, a layer of nickel iron on said copper spacer layer;

depositing, to a thickness of between about 5 and 10 Angstroms, a layer of cobalt iron, containing at least 25 atomic percent iron, on said layer of nickel iron, thereby, together with said layer of nickel iron, forming a free layer having a magnetostriction constant that is between 1 and $3\times10^{-6}$; and on said free layer, depositing an upper lead layer, thereby forming said CPP GMR read head.

13. The process described in claim 12 wherein said pinning layer is IrMn deposited to a thickness between 45 and 80 Angstroms.

14. The process described in claim 12 wherein said CPP GMR read head has a GMR ratio greater than 5.9%.

15. The process described in claim 12 wherein said cobalt iron layer contains between about 20 and 30 atomic percent iron.

16. The process described in claim 12 wherein said cobalt iron layer contains between about 40 and 60 atomic percent iron.

17. The process described in claim 12 wherein said cobalt iron layer contains between about 70 and 80 atomic percent iron.

18. The process described in claim 12 wherein said free layer has a coercivity between about 5 and 10 Oe.

* * * * *